United States Patent
Gupte

(10) Patent No.: US 11,797,566 B2
(45) Date of Patent: *Oct. 24, 2023

(54) ATTRIBUTE SHARING PLATFORM FOR DATA PROCESSING SYSTEMS

(71) Applicant: Capital One Services, LLC, McLean, VA (US)

(72) Inventor: Saurabh Gupte, San Mateo, CA (US)

(73) Assignee: Capital One Services, LLC, McLean, VA (US)

( * ) Notice: Subject to any disclaimer, the term of this patent is extended or adjusted under 35 U.S.C. 154(b) by 123 days.

This patent is subject to a terminal disclaimer.

(21) Appl. No.: 17/446,738

(22) Filed: Sep. 2, 2021

(65) Prior Publication Data

US 2022/0050856 A1    Feb. 17, 2022

Related U.S. Application Data

(63) Continuation of application No. 16/173,148, filed on Oct. 29, 2018, now Pat. No. 11,113,309, which is a
(Continued)

(51) Int. Cl.
*G06F 16/27* (2019.01)
*G06Q 10/0637* (2023.01)
(Continued)

(52) U.S. Cl.
CPC .............. *G06F 16/27* (2019.01); *G06F 8/315* (2013.01); *G06F 9/543* (2013.01); *G06F 16/24573* (2019.01); *G06Q 10/0637* (2013.01)

(58) Field of Classification Search
CPC .... G06F 16/27; G06F 16/24573; G06F 8/315; G06F 9/543; G06Q 10/0637
See application file for complete search history.

(56) References Cited

U.S. PATENT DOCUMENTS 5,574,903 A   11/1996 Szymanski et al.
5,815,415 A    9/1998 Bentley et al.
(Continued)

FOREIGN PATENT DOCUMENTS

WO    2017024236 A1    2/2017

OTHER PUBLICATIONS

Extended European Search Report for Application No. EP19177218.5, dated Oct. 2, 2019, 11 pages.
(Continued)

*Primary Examiner* — Robert W Beausoliel, Jr.
*Assistant Examiner* — Susan F Rayyan
(74) *Attorney, Agent, or Firm* — Harrity & Harrity, LLP

(57) ABSTRACT

A device may receive information for an attribute to include in a shared attribute library. The information may include an attribute identifier, data variables needed to compute a value of the attribute, and source code for computing the value of the attribute. The source code may be written in a first programming language. The device may receive a first request to compute the value of the attribute based on a first set of data variables from a first type of data application and a second request to compute the value of the attribute based on a second set of data variables from a second type of data application that is different than the first type of data application. The device may select a computing server, which may execute the first programming language, to compute the value of the attribute based on the first and second sets of data variables.

20 Claims, 9 Drawing Sheets

Related U.S. Application Data continuation of application No. 15/994,787, filed on May 31, 2018, now Pat. No. 10,120,926.

(51) Int. Cl.
 *G06F 9/54* (2006.01)
 *G06F 8/30* (2018.01)
 *G06F 16/2457* (2019.01)

(56) References Cited

U.S. PATENT DOCUMENTS

| | | | |
|---|---|---|---|
| 5,923,882 | A | 7/1999 | Ho et al. |
| 6,697,808 | B1 | 2/2004 | Hurwood et al. |
| 9,378,013 | B2 | 6/2016 | Tibble et al. |
| 9,600,501 | B1 * | 3/2017 | Fuller ................... G06F 16/27 |
| 9,633,378 | B1 | 4/2017 | Nath et al. |
| 9,838,370 | B2 | 12/2017 | Doering et al. |
| 9,886,670 | B2 | 2/2018 | Dirac et al. |
| 9,989,950 | B2 | 6/2018 | Keitel et al. |
| 10,120,926 | B1 | 11/2018 | Gupte |
| 11,113,309 | B2 | 9/2021 | Gupte |
| 2014/0156683 | A1 | 6/2014 | De Castro Alves et al. |
| 2014/0201735 | A1 | 7/2014 | Kannan et al. |
| 2014/0229857 | A1 * | 8/2014 | Haugen ................... H04L 67/53 715/753 |
| 2015/0052162 | A1 * | 2/2015 | Arnold ................... G06F 16/21 707/756 |
| 2015/0199010 | A1 | 7/2015 | Coleman et al. |
| 2015/0379423 | A1 | 12/2015 | Dirac et al. |
| 2016/0078361 | A1 | 3/2016 | Brueckner et al. |
| 2016/0140200 | A1 * | 5/2016 | Bharadwaj .......... G06F 16/2379 707/622 |
| 2016/0224360 | A1 | 8/2016 | Wagner et al. |
| 2016/0239318 | A1 * | 8/2016 | Wagner ................... G06F 9/542 |
| 2016/0301736 | A1 | 10/2016 | Cesena, Jr. et al. |
| 2018/0113681 | A1 | 4/2018 | Zhu et al. |
| 2018/0232405 | A1 | 8/2018 | Samara et al. |

OTHER PUBLICATIONS

Ruder S., "An Overview of Multi-Task Learning in Deep Neural Networks," http://ruder.io/multi-task/index.html#hardparametersharing, May 29, 2017, 34 pages.

* cited by examiner

ATTRIBUTE SHARING PLATFORM FOR DATA PROCESSING SYSTEMS

RELATED APPLICATIONS

This application is a continuation of U.S. patent application Ser. No. 16/173,148, filed Oct. 29, 2018 (now U.S. Pat. No. 11,113,309), which is a continuation of U.S. patent application Ser. No. 15/994,787, filed May 31, 2018 (now U.S. Pat. No. 10,120,926), both of which are incorporated herein by reference in their entireties.

BACKGROUND

Organizations amass large volumes of data from a variety of different sources, including from business transactions, social media, and information from sensor or machine-to-machine data. Organizations then utilize various types of analytics to process the data using batch processing applications, stream processing applications, and/or an application programming interface (API) based processing applications to process and analyze the data for various reasons, including decision making, forecasting, strategic marketing, and product development.

SUMMARY

According to some possible implementations, a method includes receiving, by a processor, information for an attribute to be included in a shared attribute library. The information may include an attribute identifier, one or more data variables needed to compute a value of the attribute, and a source code for computing the value of the attribute. The source code may be written in a first programming language. The method may include receiving, by the processor, a first request to compute the value of the attribute based on a first set of data variables from a first type of data processing application. The method may include receiving, by the processor, a second request to compute the value of the attribute based on a second set of data variables from a second type of data processing application that is different than the first type of data processing application. The method may include selecting, by the processor, a computing server from a plurality of computing servers. The computing server may be configured to execute the first programming language to compute the value of the attribute based on the first set of data variables and the second set of data variables. At least two of the plurality of computing servers may be associated with different programming languages. The method may include receiving, by the processor, a first attribute value based on using the source code to compute the value of the attribute based on the first set of data variables, and receiving, by the processor, a second attribute value based on using the source code to compute the value of the attribute based on the second set of data variables. The method may include transmitting, by the processor, the first attribute value as an input for the first type of data processing application, and transmitting, by the processor, the second attribute value as an input for the second type of data processing application.

According to some possible implementations, a device may include a memory device configured to store a shared attribute library, and one or more processors configured to receive information for an attribute to be included in the shared attribute library. The information may include an attribute identifier, one or more data variables needed to compute a value of the attribute, and a source code for computing the value of the attribute. The source code may be written in a first programming language. The one or more processors may receive a first request to compute the value of the attribute based on a first set of data variables from a first type of data processing application, and validate the first request by verifying that the first set of data variables includes the one or more data variables needed to compute the value of the attribute. The one or more processors may receive a second request to compute the value of the attribute based on a second set of data variables from a second type of data processing application that is different than the first type of data processing application, and validate the second request by verifying that the second set of data variables includes the one or more data variables needed to compute the value of the attribute. The one or more processors may select a computing server from a plurality of computing servers. The computing server may be configured to execute the first programming language to compute the value of the attribute based on the first set of data variables and the second set of data variables. At least two of the plurality of computing servers may be associated with different programming languages. The one or more processors may receive a first attribute value based on using the source code to compute the value of the attribute based on the first set of data variables, and receive a second attribute value based on using the source code to compute the value of the attribute based on the second set of data variables. The one or more processors may transmit the first attribute value as an input for the first type of data processing application, and transmit the second attribute value as an input for the second type of data processing application.

According to some possible implementations, a non-transitory computer-readable medium may store one or more instructions that, when executed by one or more processors, cause the one or more processors to receive information for an attribute to be included in a shared attribute library. The information may include an attribute identifier, one or more data variables needed to compute a value of the attribute, and a source code for computing the value of the attribute. The source code may be written in a first programming language. The one or more instructions, when executed by the one or more processors, may cause the one or more processors to receive a first request to compute the value of the attribute based on a first set of data variables from a first type of data processing application, and receive a second request to compute the value of the attribute based on a second set of data variables from a second type of data processing application. The second type of data processing application may be different than the first type of data processing application, and the first type of data processing application or the second type of data processing application may be implementing a second programming language that is different than the first programming language. The one or more instructions, when executed by the one or more processors, may cause the one or more processors to select a computing server from a plurality of computing servers. The computing server may be configured to execute the first programming language to compute the value of the attribute based on the first set of data variables and the second set of data variables. At least two of the plurality of computing servers may be associated with different programming languages. The one or more instructions, when executed by the one or more processors, may cause the one or more processors to receive a first attribute value based on using the source code to compute the value of the attribute based on the first set of data variables, and receive a second attribute value based on using the source code to compute the value of the attribute based on the second set of data variables. The one or more instructions, when executed by the one or more processors, may cause the one or more processors to transmit the first attribute value as an input for the first type of data processing application, and transmit the second attribute value as an input for the second type of data processing application.

DETAILED DESCRIPTION

Figure 1A:
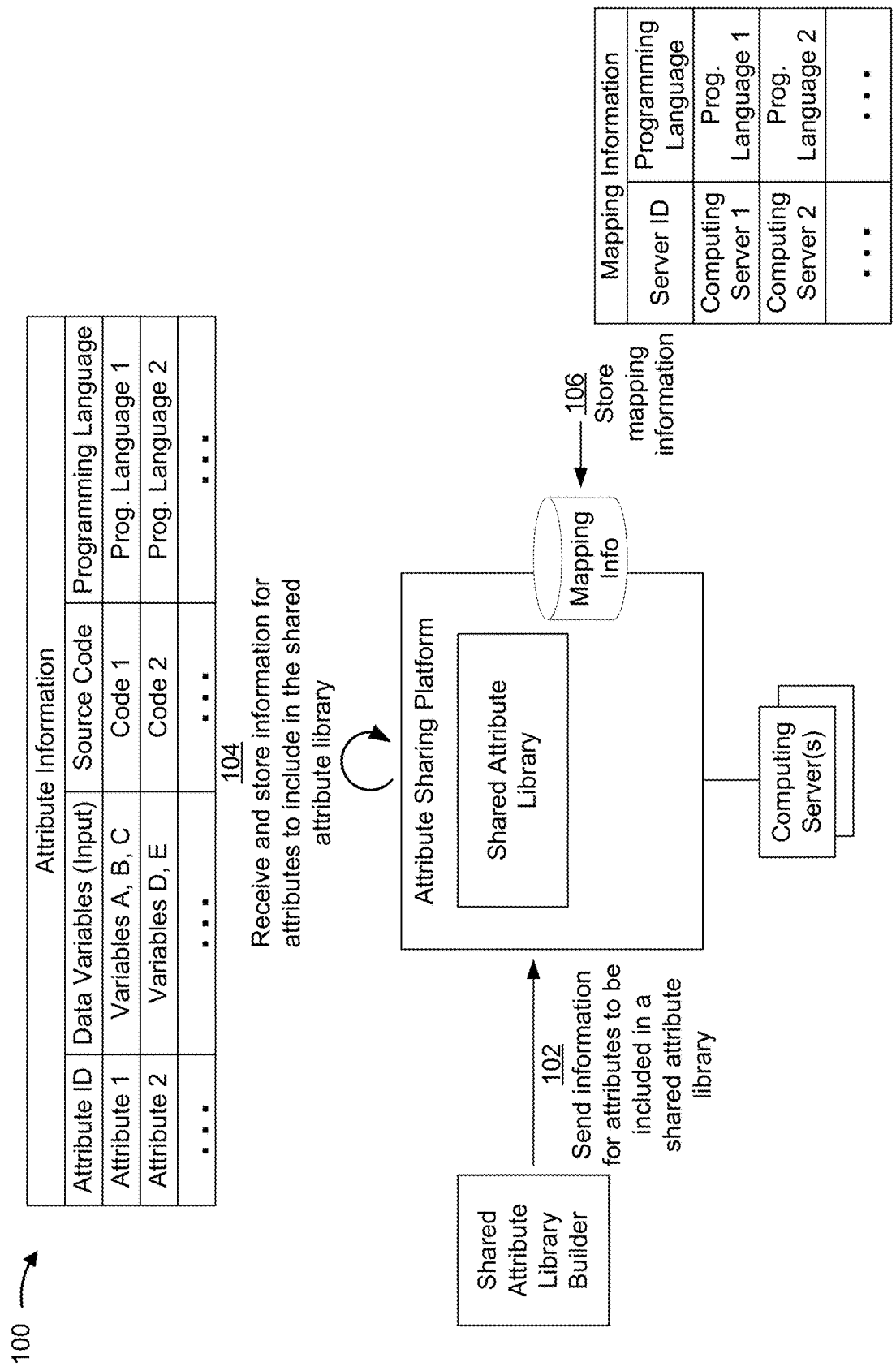
FIGS. 1A-1D are diagrams of an example implementation described herein.

The following detailed description of example implementations refers to the accompanying drawings. The same reference numbers in different drawings may identify the same or similar elements.

Data processing systems may employ multiple data processing applications to perform analytics on a large amount of data. Such data processing systems may further employ different types of data processing applications to process and/or analyze the data, or portions thereof (e.g., one or more sets of data), for use in forecasting and/or modeling aspects of a business. For example, the different types of data processing applications employed in a data processing system may include a streaming application whereby a stream of data is received and processed, a batch application whereby a batch of data (i.e., tens of records, hundreds of records, thousands of records, etc.) is received and processed, and/or an application programming interface (API) based application whereby data is received and processed using API calls.

Each of the different types of data processing applications in the data processing system may require the use of a same or common attribute when processing data. A value of the attribute may be calculated or derived based on one or more data variables and used as input for the data processing application in a machine learning system, an algorithm, a model, or another type of computation. Example attributes include a value that is calculated or computed as a sum of one or more data variables, as an average of one or more data variables, as a standard deviation of one or more data variables, as an equation based on one more data variables, and/or the like. Oftentimes, the data processing applications execute or implement different programming languages to compute the value of the attribute. Thus, a source code for computing the value of the attribute is more often duplicated or re-coded based on the programming language that the data processing application is implementing. Computing the value of the attribute differently and/or inconsistently make change management and maintenance in the data processing system more tedious and/or more difficult.

Some implementations described herein provide an attribute sharing platform including a shared attribute library. The attribute sharing platform is configured to compute values of the attribute based on different sets of data variables received from different types of data processing applications. The values of the attribute are computed by the attribute sharing program according to predefined or standardized logic or source code that is stored in the shared attribute library. The attribute sharing platform then sends the values of the attribute to the different types of data processing applications as input for the different types of data processing applications. Using standardized logic or source code to compute the values of the attributes ensures that the values of the attributes are being computed in a consistent manner throughout the data processing system, including data processing systems employing the different types of data processing applications.

The different types of data processing applications may, in some implementations, differ in regard to how the data is processed (e.g., via streaming, batch, API calls) and/or in terms of which programming language is being implemented by the data processing applications. In some implementations, the different types of data processing applications may send the attribute sharing platform requests to compute values of the attribute based on different sets of data variables (e.g., sets of data variables specific to the data processing application making the request) contained in the requests and an attribute identifier contained in the requests. The attribute sharing platform may access the source code stored in the shared attribute library for computing the value of the attribute based on the attribute identifier contained in the requests and based on the different sets of data variables. In this way, the attribute sharing platform standardizes the computation of the values of the attribute, despite differences in regard to how the data is processed by the different types of data processing applications and/or differences in the programming languages being implemented by the data processing applications.

In some implementations, the attribute sharing platform further selects a computing server to compute the values of the attribute. The computing server can be selected from a plurality of computing servers based on mapping the programming language that the source code is written in and the programming language that the computing server is executing. The values of the attributes may be computed by the computing server selected from the plurality of computing servers and sent to the data processing applications for input. In this way, the attribute sharing platform facilitates sharing of the source code for computing the values of the attribute in a language agnostic manner by virtue of mapping the programming language that the source code associated with the attribute identifier is written in and the programming language that the computing server is executing.

Moreover, the values of attributes that are computed based on the shared source code may be used as input for the different types of data processing applications. The attribute sharing platform allows the values of the attributes to be computed in a same or similar manner across multiple data processing applications of a data processing system, thereby obviating the need for recoding and/or deduplicating the source code needed to compute the values in different programming languages and conserving processing resources needed to compute the values of the attributes. Sharing the sourced code for computing the attribute across different types of data processing applications in a data processing system also conserves an amount of memory and/or storage resources needed to store source code, software, and/or data variables needed to compute the values of the attribute in different programming languages. In this way, change management and/or maintenance in the data processing system may be simplified. Additionally, the attribute sharing platform may anticipate when the computation of values of the attributes may be requested and may more easily scale computing resources on demand or as needed, thereby conserving processing resources, memory resources, and/or the like.

FIGS. 1A-1D are diagrams of an overview of an example implementation 100 described herein. As shown in FIGS. 1A-1D, example implementation 100 may include a shared attribute library builder, an attribute sharing platform, a plurality of computing servers, a plurality of data processing applications, and a plurality of clients. The attribute sharing platform may include a shared attribute library.

As shown in FIG. 1A, and by reference number 102, the shared attribute library builder may send information for attributes to be included in the shared attribute library. For example, the shared attribute library builder may be used to create, populate, build, and/or update information for the attributes to be included in the shared attribute library of the attribute sharing platform. In some implementations, the shared attribute library builder may be accessed by a user to send information associated with the attributes for storage as records in the shared attribute library of the attribute sharing platform.

As shown by reference number 104, the attribute sharing platform receives the information from the shared attribute library builder and stores the information for the attributes in the shared attribute library. The user may define or specify the attributes in the shared attribute library of the attribute sharing platform based on information such as an attribute identifier, one or more data variables needed to compute values of the attribute (i.e., the inputs), a source code needed to compute the values of the attribute, a programming language identifier for a programming language that the source code is written in, and/or the like.

In some implementations, the shared attribute library builder may include a user interface by which the user may input the information for inclusion in the shared attribute library. For example, the user interface may cause a variety of information to be displayed to the user in a manner designed to enable the user to create a new record for storage in the attribute sharing platform. In some implementations, the user interface may enable the user to generate, edit, add, delete, activate, or deactivate one or more data objects used to identify the attribute using the attribute identifier, identify the one or more variables needed to compute the values of the attribute, and/or identify the programming language that the attribute is written in using the programming language identifier. In this way, the shared attribute library builder enables the user to generate the shared attribute library based on inputting of the data objects and linking the data objects to a pre-written source code used to compute the values of the attribute. In some implementations, the attribute identifier, data variables, source code, and programming language identifier are stored in a single data structure (e.g., table) of the shared attribute library. Alternatively, or additionally, the attribute identifier, data variables, source code, and programming language identifier are stored in multiple data structures forming the shared attribute library. The data in the data structures may be linked and/or mapped together based on any of the attribute identifier, data variables, source code, programming language identifier, combinations thereof, and/or the like. In some implementations, the shared attribute library is a repository containing various records associated with attributes to be shared and/or consistently computed across data processing applications of a data processing system.

As further shown in FIG. 1A, and by reference number 106, the attribute sharing platform may additionally store mapping information for use in selecting a computing server from a pool of computing servers to compute the values of the attributes. In some implementations, the mapping information may include a computing server identifier (e.g., a name or address of the computing server) and a programming language identifier that identifies the programming language executed by the computing server. The computing server identifier may be used to identify or distinguish the computing server selected for computing the values of the attribute and the programming language identifier may be used to identify the programming language being executed or implemented by the computing server. In this way, the attribute sharing platform can select which computing server will be used to compute the value of the attribute based on the mapping between which programming language the attribute is written in and which programming language the computing server executes to compute the value. As shown in FIG. 1A, the shared attribute library and the mapping information may each include programming language identifiers, which may be used to map the attribute identifier to the computing server to ensure standardized, consistent computation of the values of the attributes. In some implementations, a computing server executes a single programming language. In some implementations, a computing server executes multiple programming languages which may be used to compute the values of the attribute. In some implementations, a first computing server executes a single programming language, and a second computing server executes multiple programming languages.

Figure 1B:
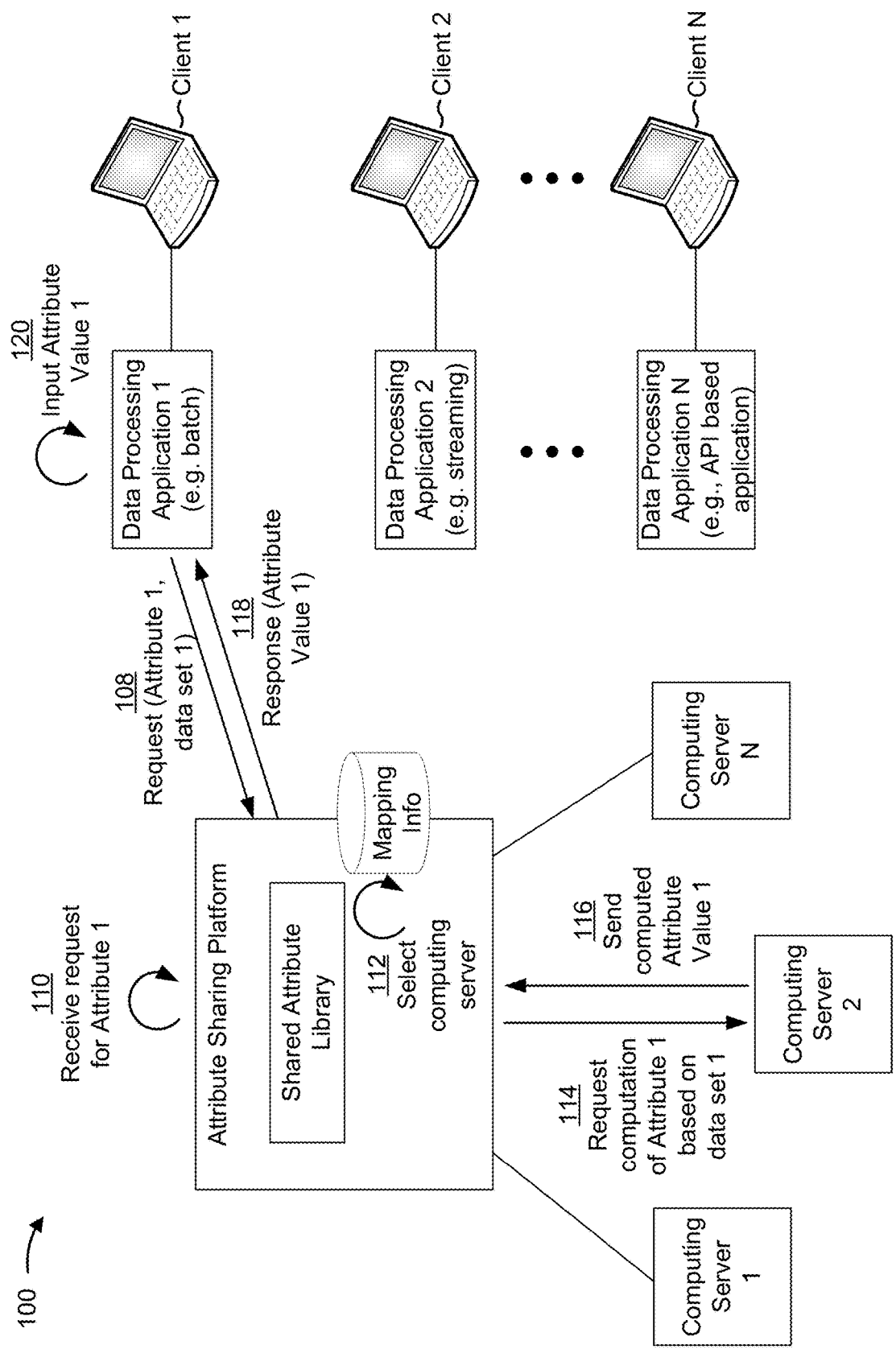

As shown in FIG. 1B, a pool of client devices, (i.e., Client 1, Client 2, and Client N, where N>2) is provided, whereby each client device in the pool of client devices is configured to execute, host, store, run, or otherwise access one or more of the data processing applications for analyzing data. Such client devices may access different types of data processing applications, for example, Client 1 may access a first data processing application that may be a batch application, Client 2 may access a second data processing application that may be a streaming application, and Client N may access a third data processing application that may be an API-based application. Although three different types of data processing applications are shown in FIG. 1B, use of more or less than three different types of data processing applications in the data processing system is contemplated.

In some implementations, the different types of data processing applications are configured to access and/or communicate with the attribute sharing platform via a common interface and standardized request to increase the efficiency at which the values of the attributes are computed. For example, the different types of data processing applications may access and/or communicate with the attribute sharing platform based on a request-response pair interface, such as Remote Procedure Calls (RPCs), Google® Remote Procedure Calls (gRPCs), and/or the like. The attribute sharing platform may likewise respond to the requests from the different types of data processing applications using the request-response pair interface. The different types of data processing applications, using the request-response pair interface, may include, in the requests, a common attribute sharing platform identifier to ensure routing of the requests to the attribute sharing platform based on the attribute sharing platform identifier. The requests from the different types of data processing applications further include the attribute identifier and a set of data variables used to compute the values of the attribute. In this way, the requests received by the attribute sharing platform are standardized irrespective of the type of data processing application sending the request. This may conserve computing resources on the attribute sharing platform relative to the platform having to process non-standardized requests. In some implementations, the attribute sharing platform may recognize which attribute to compute based on the attribute identifier provided in the request and the attribute will be computed based on the set of data variables provided in the request.

Referring still to FIG. 1B, and by reference number 108, a first data processing application (i.e., Data Processing Application 1) may send a first request to the attribute sharing platform to compute a value of the attribute based on a first set of data variables (i.e., data set 1). The first request may include the attribute sharing platform identifier, a first attribute identifier (i.e., Attribute 1), and the first data set. As shown by reference number 110, the attribute sharing platform may receive the first request and access the shared attribute library to gather information needed to compute the value of the attribute based on the first data set. For example, the attribute sharing platform may access the shared attribute library based on the attribute identifier communicated in the request.

In some implementations, the attribute sharing platform may validate the first request by verifying that the first set of data variables received from the first data processing application includes the one or more data variables needed to compute the value of the first attribute. In this way, the attribute sharing platform ensures consistency with respect to the type of data being used to compute the value of the attributes. For example, multiple computation for the values of the attribute may be based on a same quantity of data points and/or a same type of data attributes.

As an example, the value of the first attribute may be computed according to an equation based on manipulating a first set of data variables that includes three data variables. A first data variable may be an amount specified in dollars, a second data variable may be an interest rate specified as a percentage, and a third variable may be a length of time specified in months. In this case, if the data processing application does not send the first set of data variables in the correct order, as specified according to the shared attribute library, and/or does not send the correct number of data variables needed to perform the computation, then the attribute sharing platform may deny the request. Similarly, if the data processing application does not send three data variables in the correct format (e.g., in dollars, as the percentage, and/or months), and, for example, instead sends a string of alphabetical text, then the attribute sharing platform may deny the request. In this way, the attribute sharing platform ensures consistency in computation of the values of the attribute. Additionally, the attribute sharing platform can conserve computing resources that would otherwise be wasted attempting to compute values of attributes where the correct variables are not received.

As further shown in FIG. 1B, and by reference number 112, the attribute sharing platform may select the computing server configured to execute the programming language that matches the programming language of the first attribute in the shared attribute library, so that the computing server can execute the source code and compute a first value of the first attribute (i.e., a first attribute value). For example, the attribute sharing platform may perform a lookup to determine that the source code for the first attribute is written in a first programming language. The attribute sharing platform may map the first attribute identifier to the computing server based on the computing server being configured to execute the first programming language. In this way, the attribute sharing platform shares the source code for computing the value of the attribute and ensures consistent, standardized computation of values of the attribute.

As further shown in FIG. 1B, and by reference number 114, the attribute sharing platform may request computation of the value of the attribute by a second computing server (i.e., Computing Server 2). The second computing server may compute the value of the input based on executing the source code and including, as input in the source code, the first set of data variables received in the request from the first data processing application. As shown by reference number 116, the second computing server may send the first value of the attribute upon computing the first value of the attribute. As shown by reference number 118, the attribute sharing platform may respond to the request from the first data processing application and transmit the first value of the attribute. As shown by reference number 120, the first data processing application may receive the first value of the attribute and input the first value of the attribute for use in the batch application. In some implementations, the first data processing application may use the first value of the attribute as input in a machine learning system to train a model, as input to an algorithm or equation used to analyze data, or as input for any other type of computation.

Figure 1C:
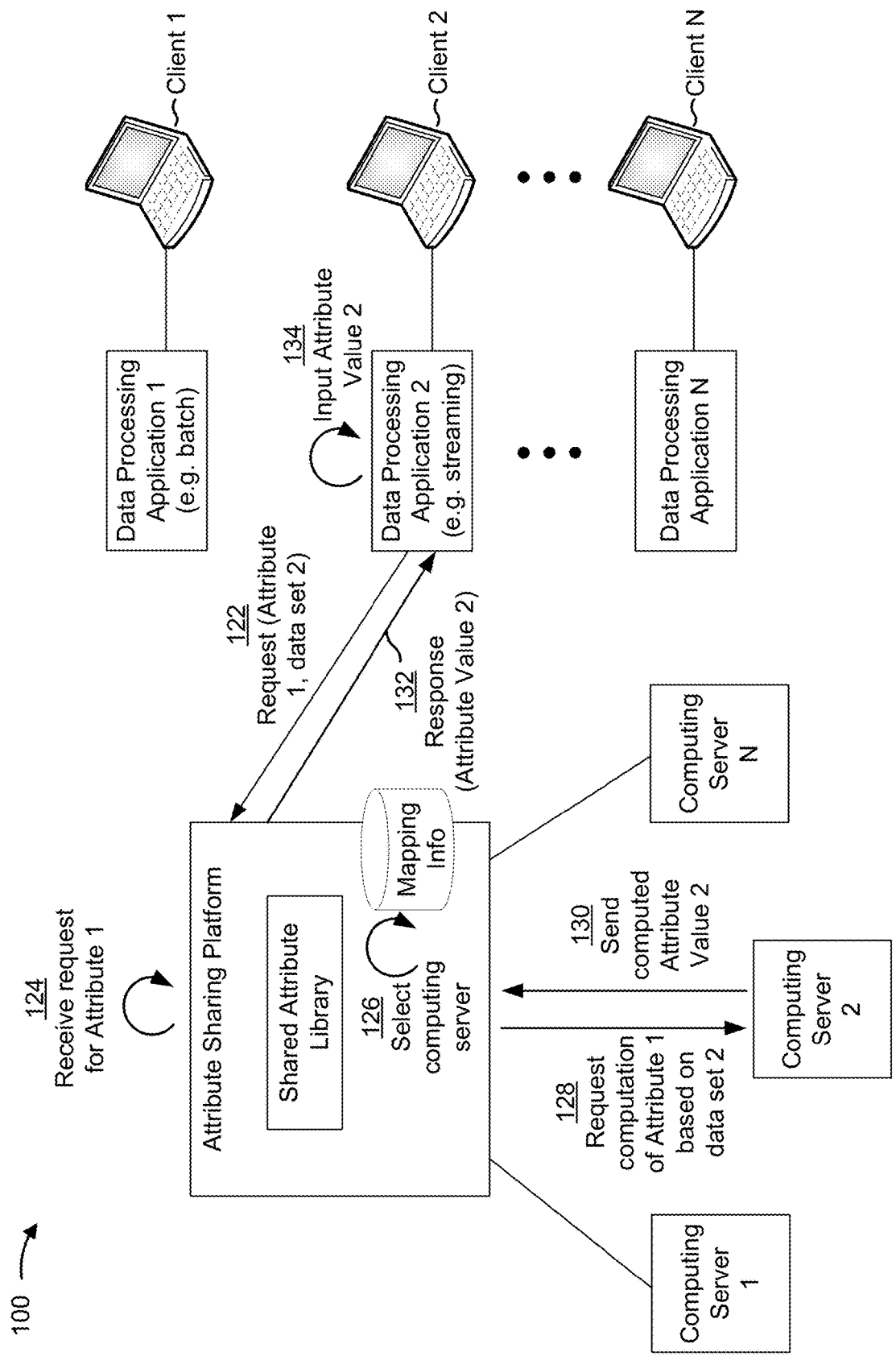

Referring now to FIG. 1C, and by reference number 122, a second data processing application may send a second request to the attribute sharing platform to compute the value of the attribute based on a second set of data variables (i.e., data set 2). That is, the second data processing application may request computation of the same attribute that was requested by the first data processing application as described above with respect to FIG. 1B. The second data processing application may be a different type of data processing application than the first data processing application. For example, the second data processing application may be a streaming application whereas the first data processing applications may be a batch application.

In some implementations, the first data processing application is the batch application which may operate based on a trigger. For example, the trigger may be a time-based trigger whereby the first data processing application sends the first request to compute the value of the attribute according to a day, a time, an expiration of a time period, and/or the like. In some implementations, the trigger may be a call or request from an API endpoint associated with the API-based data processing application. Other triggers are contemplated, for example, such as event triggers, throughput triggers, and/or the like. In some implementations, the first data processing application and/or the second data processing application may be an application that does not operate based on a trigger. In addition to being different types of data processing applications, the first data processing application may optionally implement different programming languages. In this way, the attribute sharing platform ensures consistent, standardized calculation of the same attribute (e.g., Attribute 1) based on different data sets (i.e., data set 1 from FIG. 1B and data set 2 from FIG. 1C).

In some implementations, the first request for computation of the value of the first attribute from the first data processing application and the second request for computation of the value of first attribute from the second data processing application may include a same or similar format. For example, the first request for computation of the value of the first attribute from the first data processing application and the second request for computation of the value of the first attribute from the second data processing application may be communicated using the request-response pair interface, such as the RPC or gRPC interface. Further, the first request for computation of the value of the first attribute from the first data processing application and the second request for computation of the value of the first attribute from the second data processing application may include the attribute sharing platform identifier, the attribute identifier, and the data variables used to compute the value of the first attribute. The data variables sent in the requests for computation of the value of the first attribute from the first data processing application and the second data processing application may include a same quantity of data points, a same type of data attributes (e.g., numeric data, text data, etc.), and/or a same unit of measurement (e.g., dollar amounts, time, percentages, measurements, etc.), but possibly different values of the data variables.

As further shown in FIG. 1C, and by reference number 124, the attribute sharing platform may receive the second request for computation of the value of the first attribute. In some implementations, the attribute sharing platform may optionally validate the second request by verifying that the second set of data variables received from the second data processing application incudes the one or more data variables needed to compute the value of the first attribute. In this way, the attribute sharing platform ensures consistency with respect to the type of data being used to compute the value of the first attribute. For example, computation for the values of the first attribute may be based on sets of data having the same quantity of data points, the same type of data attributes, and/or the same unit of measurement for the data attributes.

As shown by reference number 126, the attribute sharing platform may select the second computing server to compute the value of the first attribute. In this case, the selection may be based on mapping information stored by the attribute sharing platform. For example, the attribute sharing platform may select the second computing server to compute the value of the first attribute based on the first attribute identifier being mapped to source code written in the first programming language and the second computing server being configured to execute the first programming language. As shown by reference number 128, the attribute sharing platform may send a request to the second computing server for computation of a second value of the attribute (i.e., a second attribute value) based on the second set of data variables. As shown by reference number 130, the computing server may send the second value of the attribute to the second data processing application upon computing the second value of the attribute. As shown by reference number 132, the attribute sharing platform may respond to the request from the second data processing application and transmit the second value of the attribute. As shown by reference number 134, the second data processing application may receive the second value of the attribute and input the second value of the attribute for use in the streaming application. The second data processing application may use the second value of the attribute as input in a model to make predictions or forecasts on data, as input in an algorithm to analyze data, as input in a machine training or a machine learning application, and/or the like.

Figure 1D:
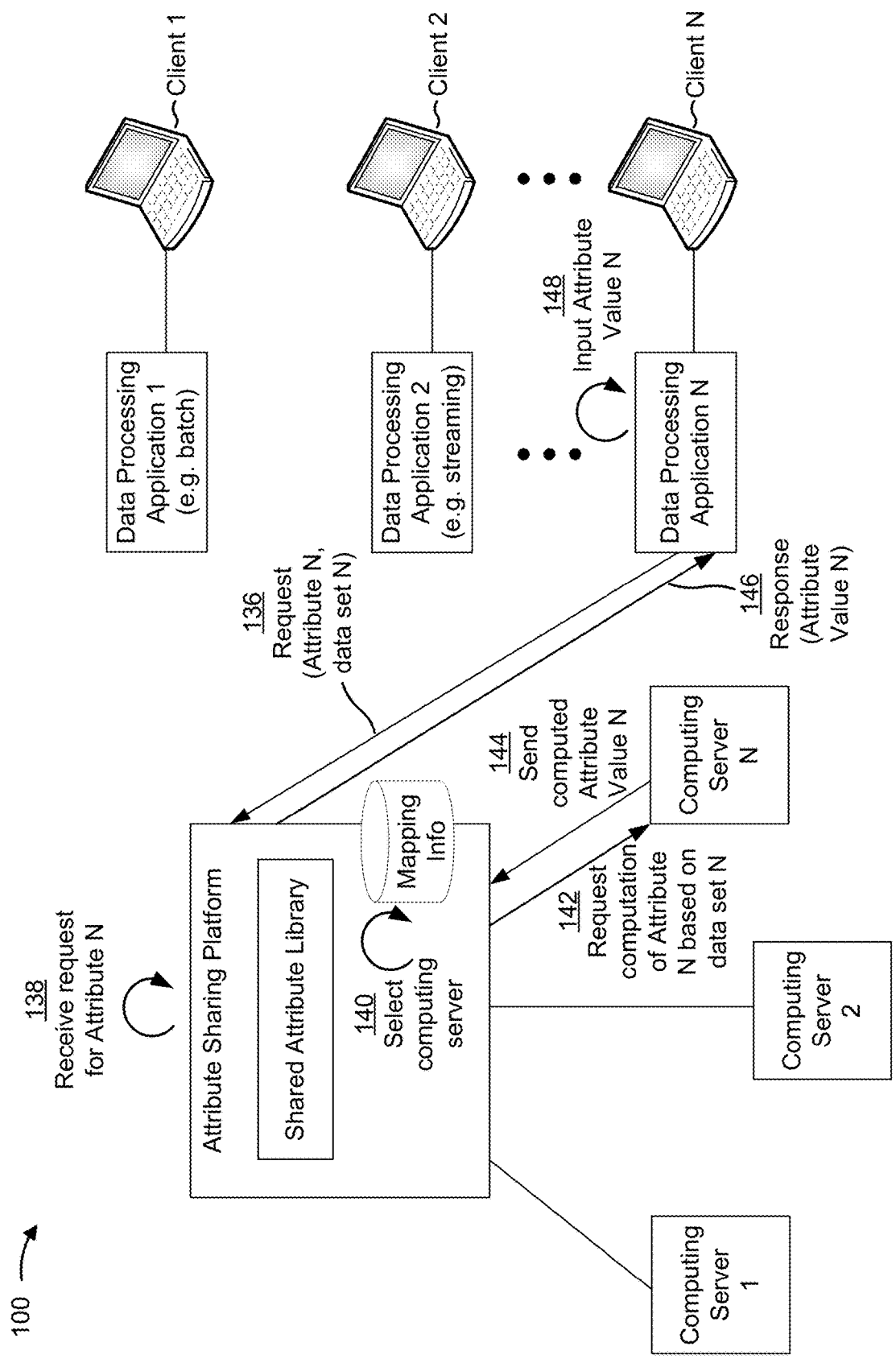

Referring now to FIG. 1D, in some implementations, the attribute sharing platform may further process a request for an Nth attribute (i.e., Attribute N) that is different from the first attribute. In this case, the attribute sharing platform may map the Nth attribute to an Nth computing server (i.e., Computing Server N) that is different than the computing server used to compute the first attribute, based on how the Nth attribute is defined in the shared attribute library of the attribute sharing platform. For example, the attribute sharing platform may select the Nth computing server, from the pool of computing servers, for computing the value of the Nth attribute based on the Nth attribute identifier being mapped to source code written in an Nth programming language and the Nth computing server being configured to execute the Nth programming language.

As further shown in FIG. 1D, and by reference number 136, an Nth data processing application may send the request to compute the value of the Nth attribute based on an Nth set of data variables. In some implementations, the Nth data processing application may be a different type of data processing application than the first data processing application and/or the second data processing application. For example, the Nth data processing application may include an API-based application whereas the first data processing application is the batch application and the second data processing application is the streaming application. In some implementations, the Nth data processing application may optionally execute a different programming language than the first data processing application and/or the second data processing application. For example, the Nth data processing application may execute the Nth programming language which may be different than the programming language executed by one or more of the other data processing applications.

In some implementations, the request from the Nth data processing application may include the same format as the request from the first data processing application and the second data processing application. For example, the request from the Nth data processing application may be sent according to the request-response pair interface and include the attribute sharing platform identifier thereby ensuring routing of the request to the attribute sharing platform based on the attribute sharing platform identifier. In this way, the requests received by the attribute sharing platform are standardized irrespective of the type of data processing application sending the request.

As shown by reference number 138, the attribute sharing platform may receive the request from the Nth data processing application. The request from the Nth data processing application may include an attribute identifier that identifies the Nth attribute and data variables used to compute the Nth attribute. Additionally, in some implementations, the attribute sharing platform may validate the request as described above. As shown by reference number 140, the attribute sharing platform may select the Nth computing server from the plurality of computing servers based on mapping the programming language used to compute the Nth attribute and the programming language executed by the Nth computing server. For example, the attribute sharing platform may determine, based on mapping information stored by the attribute sharing platform, that the Nth computing server executes the programming language needed to compute the Nth attribute based on the Nth attribute being written in the same programming language.

As further shown in FIG. 1D, and by reference number 142, the attribute sharing platform may request computation of the value of the Nth attribute. As shown by reference number 144, the computing server may send the value of the Nth attribute after computing the value of the Nth attribute. As shown by reference number 146, the attribute sharing platform may respond to the Nth data processing application by transmitting the value of the attribute N (i.e., the Nth attribute value). As shown by reference number 148, the Nth data processing application may input the value of the Nth attribute for use in processing data by the Nth data processing application. In this way, the attribute sharing platform enables the logic or source code for computing the same attributes to be shared among different data processing applications in the data processing system, thereby ensuring consistent computation of the same attributes in a language agnostic manner.

As indicated above, FIGS. 1A-1D are provided merely as examples. Other examples are possible and may differ from what was described with regard to FIGS. 1A-1D.

Figure 2:
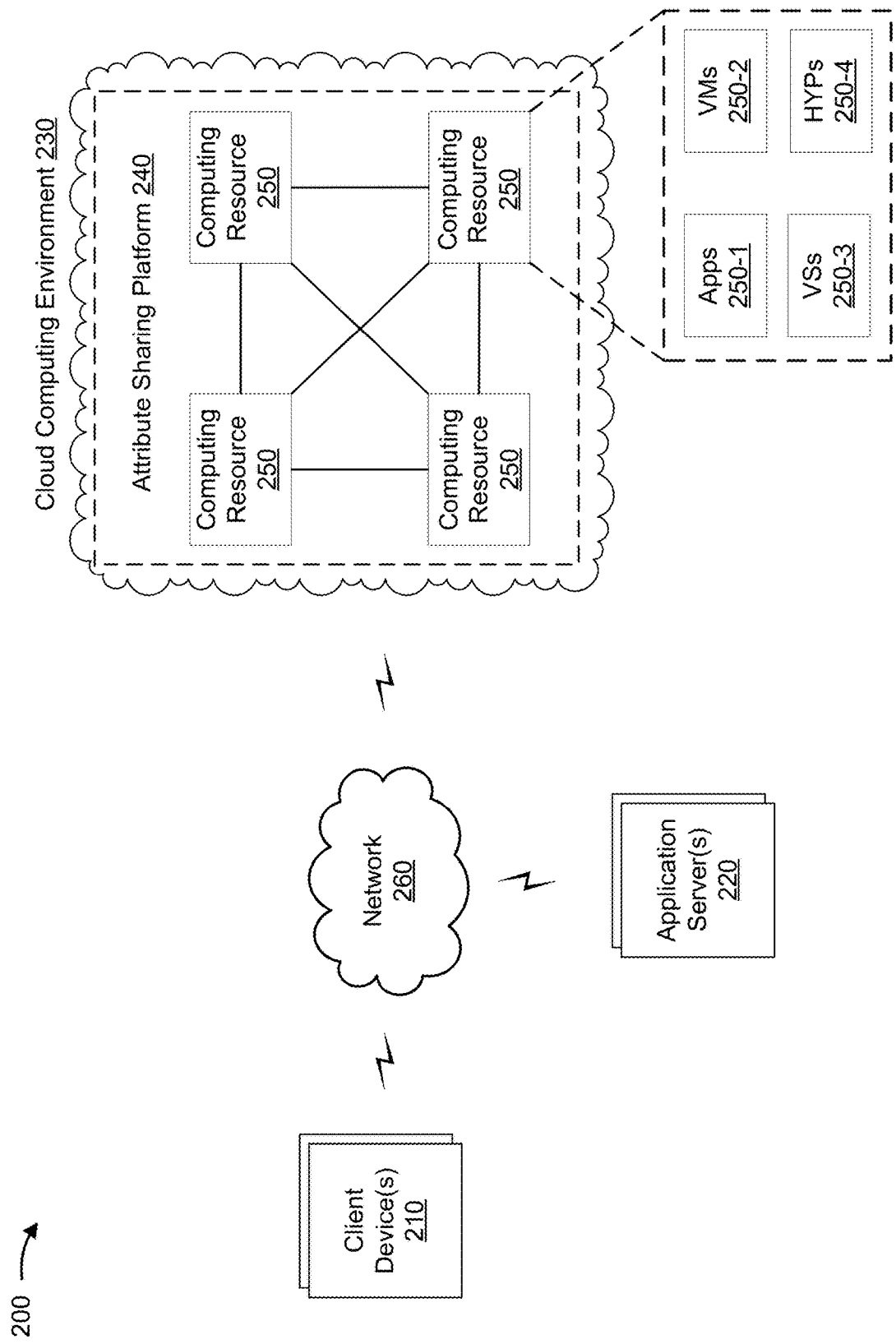
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210, one or more application servers 220, an attribute sharing platform 240, computing resource 250, and a network 260. Devices of environment 200 may interconnect via wired connections, wireless connections, or a combination of wired and wireless connections.

Client device 210 includes one or more devices capable of sending, receiving, generating, storing, processing, and/or providing information associated with sharing attribute computations using an attribute sharing platform. For example, client device 210 may include a communication and/or computing device, such as a laptop computer, a tablet computer, a handheld computer, a gaming device, a mobile phone (e.g., a smart phone, a radiotelephone, etc.), a wearable communication device (e.g., a smart wristwatch, a pair of smart eyeglasses, etc.), or a similar type of device. Client device 210 may include one or more interfaces, applications, or services designed to enable client device 210 to communicate with network 260 and application server 220 to present a user interface on a display of client device 210, such as an application designed to communicate with a data processing platform and/or the like.

Application server 220 includes one or more devices capable of sending, receiving, storing, processing, and/or providing information associated with the sharing of the attribute computations using the attribute sharing platform. For example, application server 220 may include a server device, a data center device, or a similar device. Application server 220 is configured, for example, to receive data from one or more data sources (e.g., business sources, social media sources, sensor or machine-to-machine data, etc.) to identify attributes needed for processing the received data, request the attributes from the attribute sharing platform, receive values of the attributes, and input the values of the attributes for processing data. The application servers may include servers implementing batch applications, streaming applications, API-based applications, and/or the like.

Cloud computing environment 230 includes an environment that delivers computing as a service, whereby shared resources, services, etc. may be provided to attribute sharing platform 240. Cloud computing environment 230 may provide computation, software, data access, storage, and/or other services that do not require end-user knowledge of a physical location and configuration of a system and/or a device that delivers the services. As shown, cloud computing environment 230 may include attribute sharing platform 240 and computing resource 250.

Attribute sharing platform 240 may include one or more devices capable of receiving and responding to requests to compute values of the attribute from client device 210, application server 220, the network 260, or combinations thereof. Attribute sharing platform 240 may validate requests received from client device 210, application server 220, and/or the network by verifying that the set of data variables received in the request includes the one or more data variables needed to compute the value of the attribute. Attribute sharing platform 240 may determine, using the attribute identifier, which attribute to compute and select a computing server from the plurality of computing servers as described herein. In some implementations, attribute sharing platform 240 maps the attribute to the computing server based on the computing server being configured to execute the first programming language and selecting the computing server based on the mapping.

In some implementations, the computing servers selected by the attribute sharing platform to compute values for the attributes may correspond to computing resource 250 in cloud computing environment 230. In other implementations, the computing servers selected by the attribute sharing platform to compute values for the attributes may be outside of cloud computing environment 230. In other implementations, the computing servers selected by the attribute sharing platform to compute values for the attributes may be separate from cloud computing environment 230 and may communicate with attribute sharing platform 240 via network 260.

Computing resource 250 includes one or more personal computers, workstation computers, server devices, or another type of computation and/or communication device. In some implementations, computing resource 250 may host attribute sharing platform 240. The cloud resources may include compute instances executing in computing resource 250, storage devices provided in computing resource 250, data transfer devices provided by computing resource 250, etc. In some implementations, computing resource 250 may communicate with other computing resource 250 via wired connections, wireless connections, or a combination of wired and wireless connections.

As further shown in FIG. 2, computing resource 250 may include a group of cloud resources, such as one or more applications (APPs) 250-1, one or more virtual machines (VMs) 250-2, virtualized storage (VSs) 250-3, one or more hypervisors (HYPs) 250-4, or the like.

Application 250-1 includes one or more software applications that may be provided to or accessed by client device 210. Application 250-1 may eliminate a need to install and execute the software applications on client device 210. For example, application 250-1 may include software associated with attribute sharing platform 240 and/or any other software capable of being provided via cloud computing environment 230. In some implementations, one application 250-1 may send/receive information to/from one or more other applications 250-1, via virtual machine 250-2.

Virtual machine 250-2 includes a software implementation of a machine (e.g., a computer) that executes programs like a physical machine. Virtual machine 250-2 may be either a system virtual machine or a process virtual machine, depending upon use and degree of correspondence to any real machine by virtual machine 250-2. A system virtual machine may provide a complete system platform that supports execution of a complete operating system (OS). A process virtual machine may execute a single program and may support a single process. In some implementations, virtual machine 250-2 may execute on behalf of a user (e.g., client device 210), and may manage infrastructure of cloud computing environment 230, such as data management, synchronization, or long-duration data transfers.

Virtualized storage 250-3 includes one or more storage systems and/or one or more devices that use virtualization techniques within the storage systems or devices of computing resource 250. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 250-4 provides hardware virtualization techniques that allow multiple operating systems (e.g., "guest operating systems") to execute concurrently on a host computer, such as computing resource 250. Hypervisor 250-4 may present a virtual operating platform to the guest operating systems and may manage the execution of the guest operating systems. Multiple instances of a variety of operating systems may share virtualized hardware resources.

Network 260 includes one or more wired and/or wireless networks. For example, network 260 may include a communications network, a telecommunications network, a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
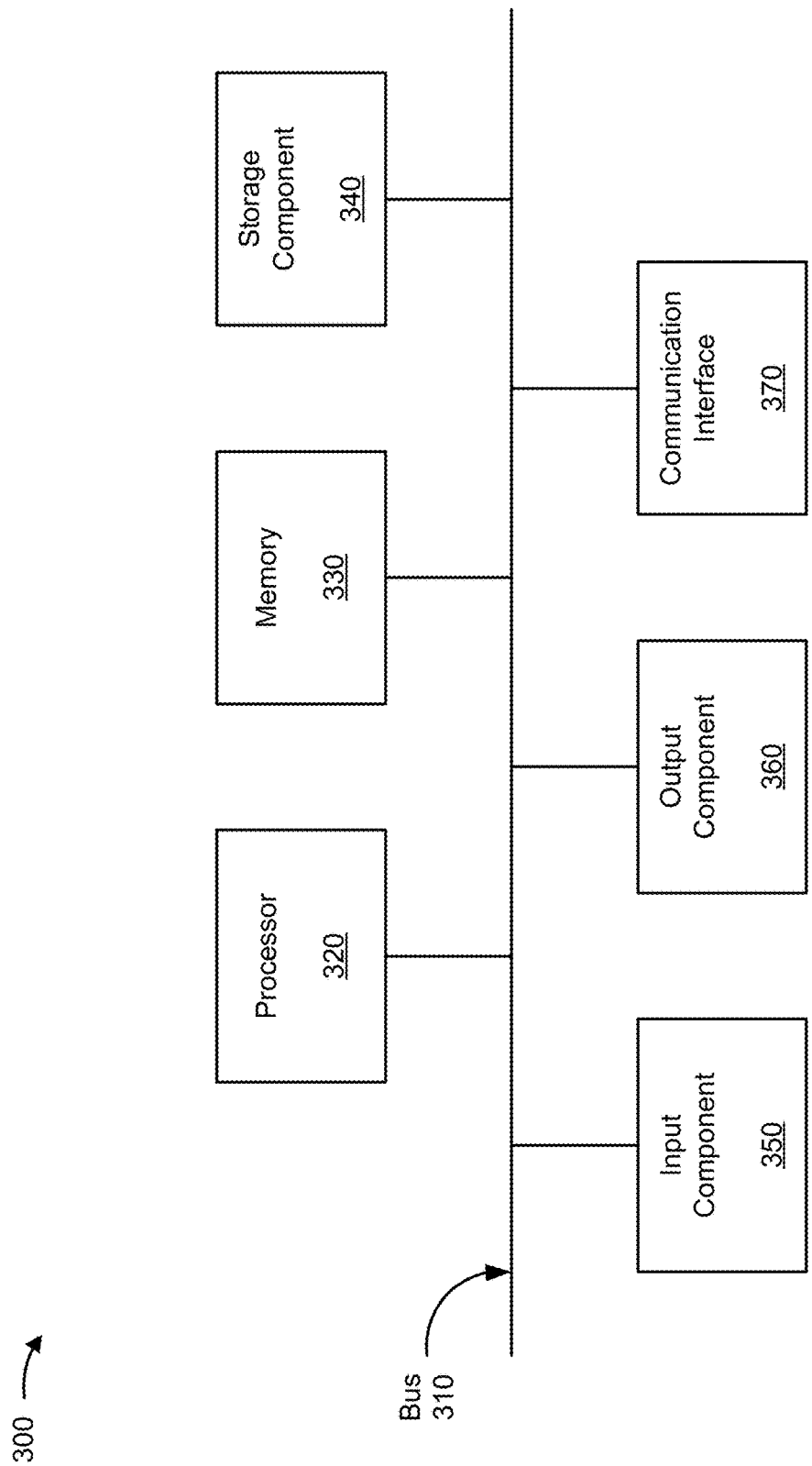
FIG. 3 is a diagram of example components of one or more devices of FIG. 2.

FIG. 3 is a diagram of example components of a device 300. Device 300 may correspond to client device 210, application server 220, attribute sharing platform 240, and/or computing resource 250. In some implementations, client device 210, application server 220, attribute sharing platform 240, and/or computing resource 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 may include a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 may include a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more of the processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
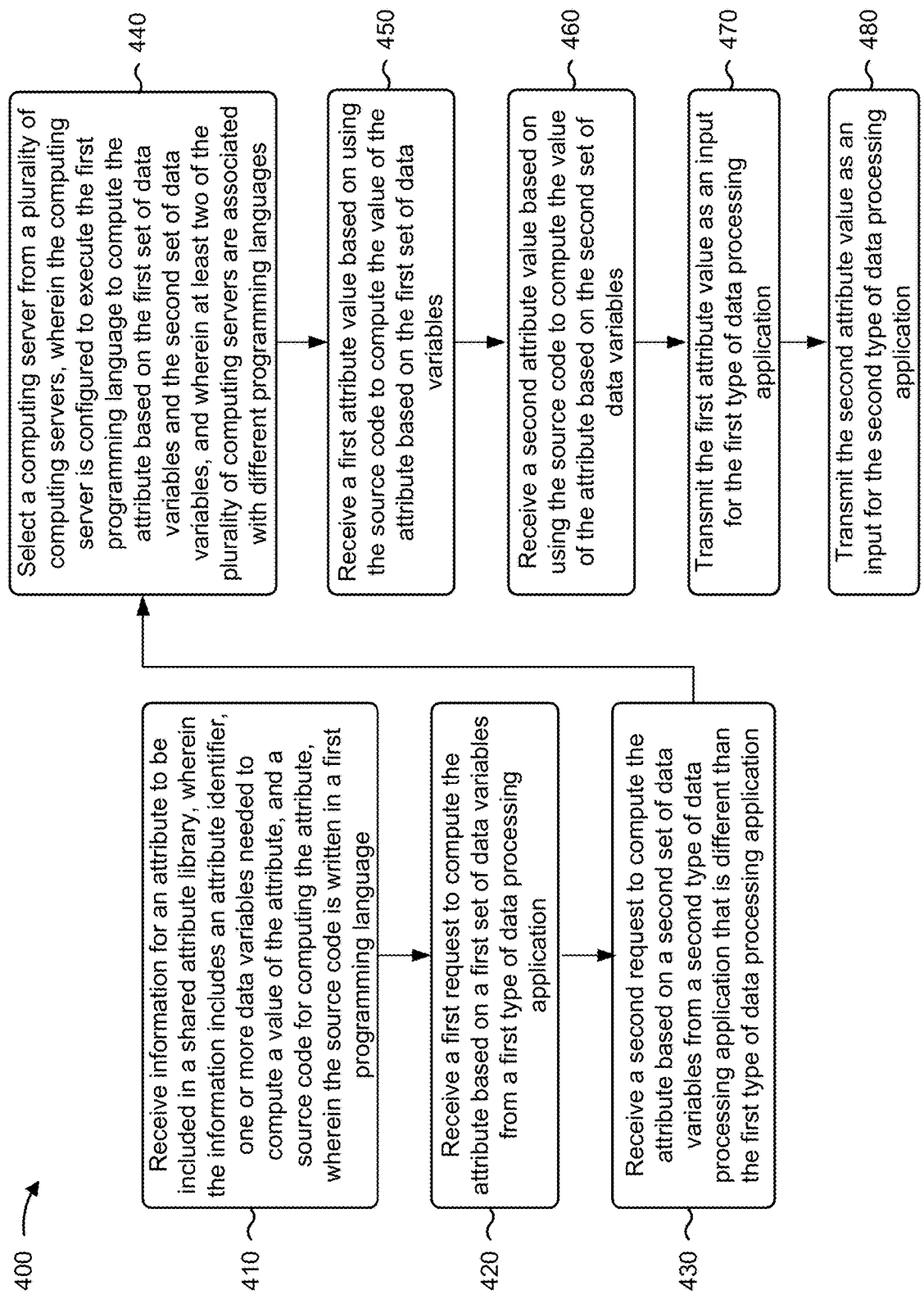
FIG. 4 is a flow chart of an example process for sharing attribute computation using an attribute sharing platform.

FIG. 4 is a flow chart of an example process 400 for sharing attribute computation using an attribute sharing platform. In some implementations, one or more process blocks of FIG. 4 may be performed by an attribute sharing platform (e.g., attribute sharing platform 240). In some implementations, one or more process blocks of FIG. 4 may be performed by another device or a group of devices separate from or including attribute sharing platform 240, such as client device 210, or application server 220.

As shown in FIG. 4, process 400 may include receiving information for an attribute to be included in a shared attribute library, wherein the information includes an attribute identifier, one or more data variables needed to compute a value of the attribute, and a source code for computing the value of the attribute, and wherein the source code is written in a first programming language (block 410). For example, the attribute sharing platform (e.g., attribute sharing platform 240, using computing resource 250, processor 320, memory 330, storage component 340, input component 350, communication interface 370, and/or the like) may receive the information for the attribute to be included in the shared attribute library, as described with regard to FIGS. 1A-1D. In some implementations, the information received by the attribute sharing platform includes an attribute identifier, one or more data variables needed to compute the value of the attribute, and a source code for computing the value of the attribute. In some implementations, the source code is written in a first programming language.

As further shown in FIG. 4, process 400 may include receiving a first request to compute the value of the attribute based on a first set of data variables from a first type of data processing application (block 420). For example, the attribute sharing platform (e.g., attribute sharing platform 240, using computing resource 250, processor 320, memory 330, storage component 340, input component 350, communication interface 370, and/or the like) may receive the first request to compute the value of the attribute based on the first set of data variables from the first type of data processing application, as described with regard to FIGS. 1A-1D.

As further shown in FIG. 4, process 400 may include receiving a second request to compute the value of the attribute based on a second set of data variables from a second type of data processing application that is different than the first type of data processing application (block 430). For example, the attribute sharing platform (e.g., attribute sharing platform 240, using computing resource 250, processor 320, memory 330, storage component 340, input component 350, communication interface 370, and/or the like) may receive the second request to compute the value of the attribute based on the second set of data variables from the second type of data processing application that is different than the first type of data processing application, as described with regard to FIGS. 1A-1D.

As further shown in FIG. 4, process 400 may include selecting, by the processor, a computing server from a plurality of computing servers, wherein the computing server is configured to execute the first programming language to compute the value of the attribute based on the first set of data variables and the second set of data variables, and wherein at least two of the plurality of computing servers are associated with different programming languages (block 440). For example, the attribute sharing platform (e.g., attribute sharing platform 240, using computing resource 250, processor 320, memory 330, storage component 340, and/or the like) may select a computing server from a plurality of computing servers, as described with regard to FIGS. 1A-1D. In some implementations, the computing server is configured to execute the first programming language to compute the value of the attribute based on the first set of data variables and the second set of data variables. In some implementations, at least two of the plurality of computing servers are associated with different programming languages.

As further shown in FIG. 4, process 400 may include receiving a first attribute value based on using the source code to compute the value of the attribute based on the first set of data variables (block 450). For example, the attribute sharing platform (e.g., attribute sharing platform 240, using computing resource 250, processor 320, memory 330, storage component 340, input component 350, communication interface 370, and/or the like) may receive the first attribute value based on using the source code to compute the value of the attribute based on the first set of data variables, as described with regard to FIGS. 1A-1D.

As further shown in FIG. 4, process 400 may include receiving a second attribute value based on using the source code to compute the value of the attribute based on the second set of data variables (block 460). For example, the attribute sharing platform (e.g., attribute sharing platform 240, using computing resource 250, processor 320, memory 330, storage component 340, input component 350, communication interface 370, and/or the like) may receive the second attribute value based on using the source code to compute the value of the attribute based on the second set of data variables, as described with regard to FIGS. 1A-1D.

As further shown in FIG. 4, process 400 may include transmitting the first attribute value as an input for the first type of data processing application (block 470). For example, the attribute sharing platform (e.g., attribute sharing platform 240, using computing resource 250, processor 320, memory 330, storage component 340, output component 360, communication interface 370, and/or the like) may transmit the first attribute value as the input for the first type of data processing application, as described with regard to FIGS. 1A-1D.

As further shown in FIG. 4, process 400 may include transmitting the second attribute value as an input for the second type of data processing application (block 480). For example, the attribute sharing platform (e.g., attribute sharing platform 240, using computing resource 250, processor 320, memory 330, storage component 340, output component 360, communication interface 370, and/or the like) may transmit the second attribute value as the input for the second type of data processing application, as described with regard to FIGS. 1A-1D.

Process 400 may include additional aspects, such as any single implementation or any combination of aspects described below and/or in connection with the one or more processes described elsewhere herein In some implementations, the first type of data processing application and the second type of data processing application are at least one of a batch application, a streaming application, or an API-based application. In some implementations, the first set of data variables and the second set of data variables include a same quantity of data points and a same type of data attributes.

In some implementations, the first type of data processing application or the second type of data processing application is implementing a second programming language that is different than the first programming language. In some implementations, at least one of the first type of data processing application or the second type of data processing application is an application that operates based on a trigger. In some implementations, at least one of the first type of data processing application or the second type of data processing application is an application that does not operate based on a trigger.

In some implementations, process 400 may include validating the first request by verifying that the first set of data variables includes the one or more data variables needed to compute the value of the attribute and validating the second request by verifying that the second set of data variables includes the one or more data variables needed to compute the value of the attribute.

In some implementations, selecting the computing server from the plurality of computing servers comprises mapping the attribute to the computing server based on the computing server being configured to execute the first programming language and selecting the computing server based on the mapping.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
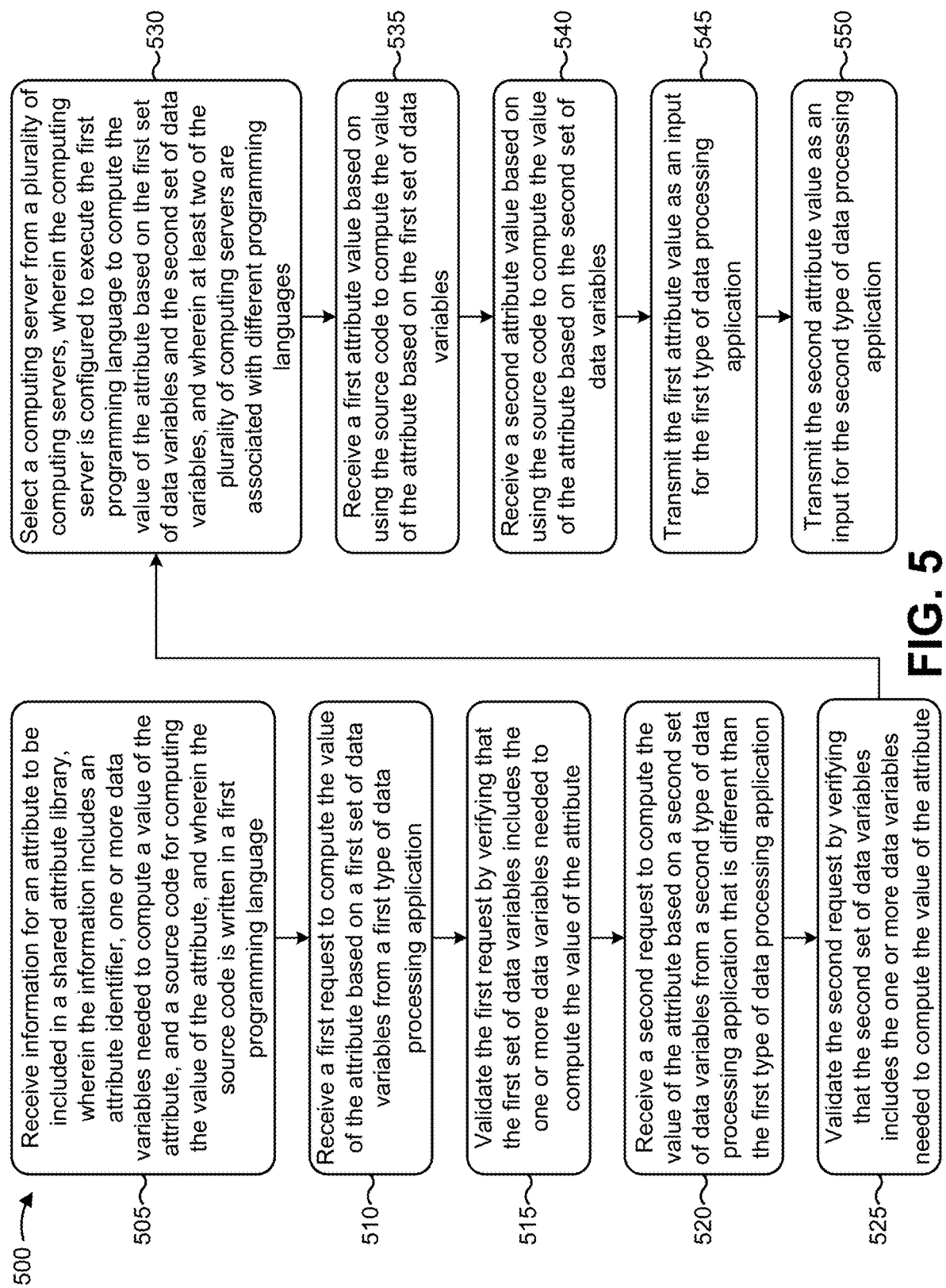
FIG. 5 is a flow chart of a further example process for sharing attribute computation using an attribute sharing platform.

FIG. 5 is a flow chart of a further example process for sharing attribute computation using an attribute sharing platform. In some implementations, one or more process blocks of FIG. 5 may be performed by an attribute sharing platform 240. In some implementations, one or more process blocks of FIG. 5 may be performed by another device or a group of devices separate from or including an attribute sharing platform 240, such as client device 210, or application server 220.

As shown in FIG. 5, process 500 may include receiving information for an attribute to be included in the shared attribute library, wherein the information includes an attribute identifier, one or more data variables needed to compute a value of the attribute, and a source code for computing the value of the attribute, and wherein the source code is written in a first programming language (block 505). For example, the attribute sharing platform (e.g., attribute sharing platform 240, using computing resource 250, processor 320, memory 330, storage component 340, input component 350, communication interface 370 and/or the like) may receive information for an attribute to be included in a shared attribute library, as described with regard to FIGS. 1A-1D. In some implementations, the information includes an attribute identifier, one or more data variables needed to compute a value of the attribute, and a source code for computing the value of the attribute. In some implementations, the source code is written in a first programming language.

As further shown in FIG. 5, process 500 may include receiving a first request to compute the value of the attribute based on a first set of data variables from a first type of data processing application (block 510). For example, the attribute sharing platform (e.g., attribute sharing platform 240, using computing resource 250, processor 320, memory 330, storage component 340, input component 350, communication interface 370, and/or the like) may receive a first request to compute the value of the attribute based on a first set of data variables from the first type of data processing application, as described with regard to FIGS. 1A-1D.

As further shown in FIG. 5, process 500 may include validating the first request by verifying that the first set of data variables includes the one or more data variables needed to compute the value of the attribute (block 515). For example, the attribute sharing platform (e.g., attribute sharing platform 240, using computing resource 250, processor 320, memory 330, storage component 340, input component 350, communication interface 370, and/or the like) may validate the first request by verifying that the first set of data variables includes the one or more data variables needed to compute the value of the attribute, as described with regard to FIGS. 1A-1D.

As further shown in FIG. 5, process 500 may include receiving a second request to compute the value of the attribute based on a second set of data variables from a second type of data processing application that is different than the first type of data processing application (block 520). For example, the attribute sharing platform (e.g., attribute sharing platform 240, using computing resource 250, processor 320, memory 330, storage component 340, input component 350, communication interface 370, and/or the like) may receive a second request to compute the value of the attribute based on a second set of data variables from the second type of data processing application that is different than the first type of data processing application, as described with regard to FIGS. 1A-1D.

As further shown in FIG. 5, process 500 may include validating the second request by verifying that the second set of data variables includes the one or more data variables needed to compute the value of the attribute (block 525). For example, the attribute sharing platform (e.g., attribute sharing platform 240, using computing resource 250, processor 320, memory 330, storage component 340, input component 350, communication interface 370, and/or the like) may validate the second request by verifying that the second set of data variables includes the one or more data variables needed to compute the value of the attribute, as described with regard to FIGS. 1A-1D.

As further shown in FIG. 5, process 500 may include selecting a computing server from a plurality of computing servers, wherein the computing server is configured to execute the first programming language to compute the value of the attribute based on the first set of data variables and the second set of data variables, and wherein at least two of the plurality of computing servers are associated with different programming languages (block 530). For example, the attribute sharing platform (e.g., attribute sharing platform 240, using computing resource 250, processor 320, memory 330, storage component 340, input component 350, communication interface 370, and/or the like) may select a computing server from the plurality of computing servers, as described with regard to FIGS. 1A-1D. In some implementations, the computing server is configured to execute the first programming language to compute the value of the attribute based on the first set of data variables and the second set of data variables. In some implementations, at least two of the plurality of computing servers are associated with different programming languages.

As further shown in FIG. 5, process 500 may include receiving a first attribute value based on using the source code to compute the value of the attribute based on the first set of data variables (block 535). For example, the attribute sharing platform (e.g., attribute sharing platform 240, using computing resource 250, processor 320, memory 330, storage component 340, input component 350, communication interface 370, and/or the like) may receive the first attribute value based on using the source code to compute the value of the attribute based on the first set of data variables, as described with regard to FIGS. 1A-1D.

As further shown in FIG. 5, process 500 may include receiving a second attribute value based on using the source code to compute the value of the attribute based on the second set of data variables (block 540). For example, the attribute sharing platform (e.g., attribute sharing platform 240, using computing resource 250, processor 320, memory 330, storage component 340, input component 350, communication interface 370, and/or the like) may receive the second attribute value based on using the source code to compute the value of the attribute based on the second set of data variables, as described with regard to FIGS. 1A-1D.

As further shown in FIG. 5, process 500 may include transmitting the first attribute value as an input for the first type of data processing application (block 545). For example, the attribute sharing platform (e.g., attribute sharing platform 240, using computing resource 250, processor 320, memory 330, storage component 340, input component 350, communication interface 370, and/or the like) may transmit the first attribute value as an input for the first type of data processing application, as described with regard to FIGS. 1A-1D.

As further shown in FIG. 5, process 500 may include transmitting the second attribute value as an input for the second type of data processing application (block 550). For example, the attribute sharing platform (e.g., attribute sharing platform 240, using computing resource 250, processor 320, memory 330, storage component 340, input component 350, communication interface 370, and/or the like) may transmit the second attribute value as an input for the second type of data processing application, as described with regard to FIGS. 1A-1D.

Process 500 may include additional aspects, such as any single implementation or any combination of aspects described below and/or in connection with the one or more processes described elsewhere herein.

In some implementations, the first type of data processing application and the second type of data processing application are at least one of a batch application, a streaming application, or an API-based application. In some implementations, the first set of data variables and the second set of data variables include a same quantity of data points and a same type of data attributes. In some implementations, the first type of data processing application or the second type of data processing application is implementing a second programming language that is different than the first programming language.

In some implementations, at least one of the first type of data processing application or the second type of data processing application is an application that operates based on a trigger. In some implementations, the trigger is a time-based trigger. In some implementations, the trigger is a request from an API-endpoint.

In some implementations, process 500 may include mapping the attribute to the computing server based on the computing server being configured to execute the first programming language and selecting the computing server based on the map of the attribute to the computer server.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
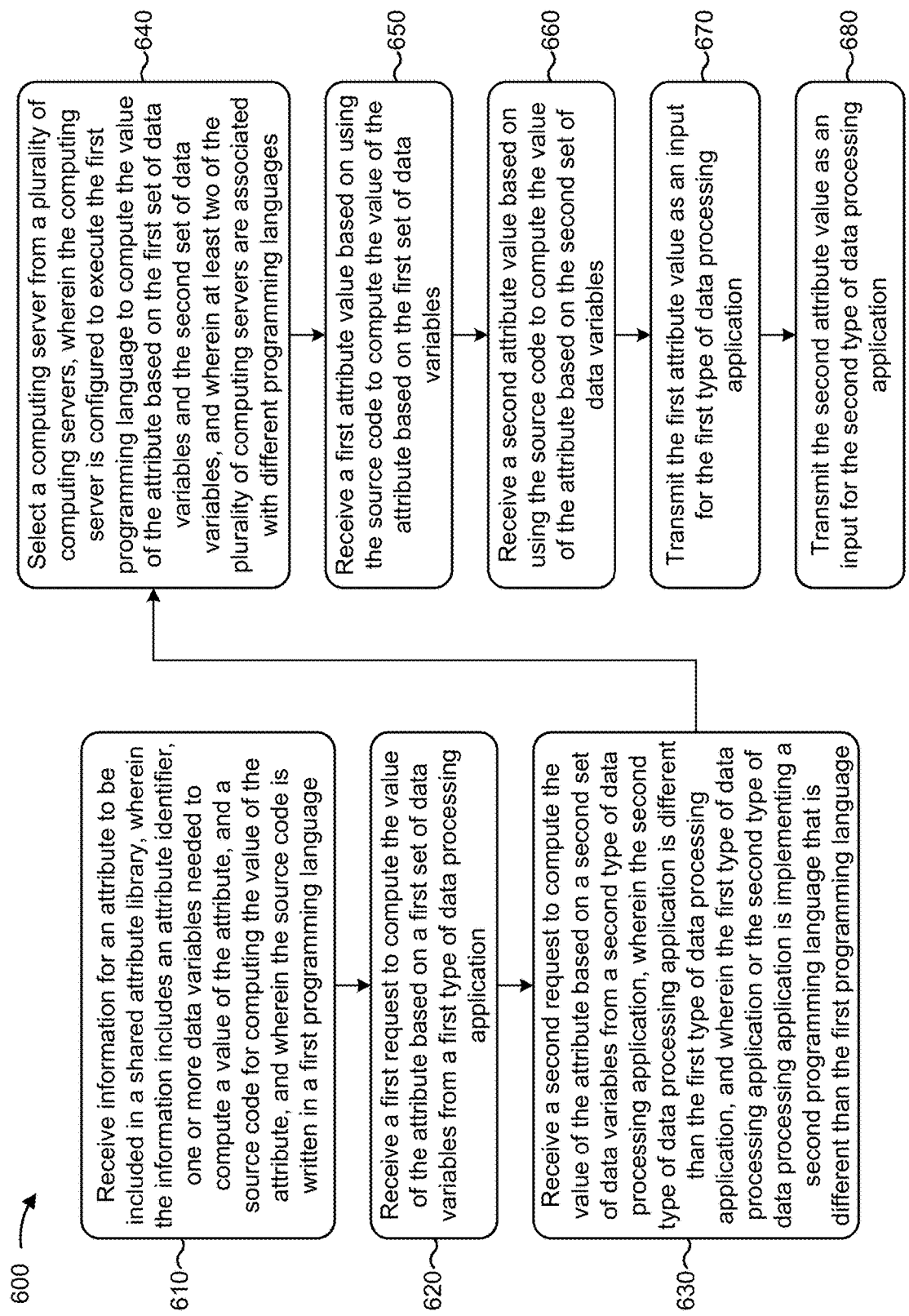
FIG. 6 is a flow chart of a further example process for sharing attribute computation using an attribute sharing platform.

FIG. 6 is a flow chart of a further example process for sharing attribute computation using an attribute sharing platform. In some implementations, one or more process blocks of FIG. 6 may be performed by an attribute sharing platform 240. In some implementations, one or more process blocks of FIG. 6 may be performed by another device or a group of devices separate from or including an attribute sharing platform 240, such as client device 210, or application server 220.

As shown in FIG. 6, process 600 may include receiving information for an attribute to be included in a shared attribute library, wherein the information includes an attribute identifier, one or more data variables needed to compute a value of the attribute, and a source code for computing the value of the attribute, and wherein the source code is written in a first programming language (block 610). For example, the attribute sharing platform (e.g., attribute sharing platform 240, using computing resource 250, processor 320, memory 330, storage component 340, input component 350, communication interface 370, and/or the like) may receive information for an attribute to be included in a shared attribute library, as described with regard to FIGS. 1A-1D. In some implementations, the information includes an attribute identifier, one or more data variables needed to compute a value of the attribute, and a source code for computing the value of the attribute. In some implementations, wherein the source code is written in a first programming language.

As further shown in FIG. 6, process 600 may include receiving a first request to compute the value of the attribute based on a first set of data variables from a first type of data processing application (block 620). For example, the attribute sharing platform (e.g., attribute sharing platform 240, using computing resource 250, processor 320, memory 330, storage component 340, input component 350, communication interface 370, and/or the like) may receive the first request to compute the value of the attribute based on the first set of data variables from the first type of data processing application, as described with regard to FIGS. 1A-1D.

As further shown in FIG. 6, process 600 may include receiving a second request to compute the value of the attribute based on a second set of data variables from a second type of data processing application, wherein the second type of data processing application is different than the first type of data processing application, and wherein the first type of data processing application or the second type of data processing application is implementing a second programming language that is different than the first programming language (block 630). For example, the attribute sharing platform (e.g., attribute sharing platform 240, using computing resource 250, processor 320, memory 330, storage component 340, input component 350, communication interface 370, and/or the like) may receive a second request to compute the value of the attribute based on a second set of data variables from the second type of data processing application, as described with regard to FIGS. 1A-1D. In some implementations, the second type of data processing application is different than the first type of data processing application. In some implementations, the first type of data processing application or the second type of data processing application is implementing a second programming language that is different than the first programming language.

As further shown in FIG. 6, process 600 may include selecting a computing server from a plurality of computing servers, wherein the computing server is configured to execute the first programming language to compute the value of the attribute based on the first set of data variables and the second set of data variables, and wherein at least two of the plurality of computing servers are associated with different programming languages (block 640). For example, the attribute sharing platform (e.g., attribute sharing platform 240, using computing resource 250, processor 320, memory 330, storage component 340, input component 350, communication interface 370, and/or the like) may select a computing server from the plurality of computing servers, as described with regard to FIGS. 1A-1D. In some implementations, the computing server is configured to execute the first programming language to compute the value of the attribute based on the first set of data variables and the second set of data variables. In some implementations, at least two of the plurality of computing servers are associated with different programming languages.

As further shown in FIG. 6, process 600 may include receiving a first attribute value based on using the source code to compute the value of the attribute based on the first set of data variables (block 650). For example, the attribute sharing platform (e.g., attribute sharing platform 240, using computing resource 250, processor 320, memory 330, storage component 340, input component 350, communication interface 370, and/or the like) may receive the first attribute value based on using the source code to compute the value of the attribute based on the first set of data variables, as described with regard to FIGS. 1A-1D.

As further shown in FIG. 6, process 600 may include receiving a second attribute value based on using the source code to compute the value of the attribute based on the second set of data variables (block 660). For example, the attribute sharing platform (e.g., attribute sharing platform 240, using computing resource 250, processor 320, memory 330, storage component 340, input component 350, communication interface 370, and/or the like) may receive a second attribute value based on using the source code to compute the value of the attribute based on the second set of data variables, as described with regard to FIGS. 1A-1D.

As further shown in FIG. 6, process 600 may include transmitting the first attribute value as an input for the first type of data processing application (block 670). For example, the attribute sharing platform (e.g., attribute sharing platform 240, using computing resource 250, processor 320, memory 330, storage component 340, input component 350, communication interface 370, and/or the like) may transmit the first attribute value as the input for the first type of data processing application, as described with regard to FIGS. 1A-1D.

As further shown in FIG. 6, process 600 may include transmitting the second attribute value as an input for the second type of data processing application (block 680). For example, the attribute sharing platform (e.g., attribute sharing platform 240, using computing resources 250, processor 320, memory 330, storage component 340, input component 350, communication interface 370, and/or the like) may transmit the second attribute value as the input for the second type of data processing application, as described with regard to FIGS. 1A-1D.

Process 600 may include additional aspects, such as any single implementation or any combination of aspects described below and/or in connection with the one or more processes described elsewhere herein.

In some implementations, process 600 may include validating the first request by verifying that the first set of data variables includes the one or more data variables needed to compute the value of the attribute and validating the second request by verifying that the second set of data variables includes the one or more data variables needed to compute the value of the attribute.

In some implementations, process 600 may include mapping the attribute to the computing server based on the computing server being configured to execute the first programming language and selecting the computing server based on the mapping.

In some implementations, process 600 may include receiving a third request to compute the value of the attribute based on a third set of data variables from a third type of data processing application. In some implementations, the third type of data processing application is different than the first type of data processing application and the second type of data processing application.

In some implementations, process 600 may include selecting the computing server from a plurality of computing servers. In some implementations, the computing server is configured to execute the first programming language to compute the value of the attribute based on the third set of data variables. In some implementations, process 600 may include receiving a third attribute value based on using the source code to compute the value of the attribute based on the third set of data variables and transmitting the third attribute value as an input for the third type of data processing application.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As described herein, providing the attribute sharing platform including the shared attribute library standardizes the core computation of attributes based on using the same source code to compute the shared attributes for different data processing applications. As a result, calculating the attributes across multiple data processing applications within a data processing system may be consistent, easing the burden of change management and simplifying attribute code development and sharing.

Further, the different types of applications implementing different computing languages may access the shared attributes and compute values for the shared attributes according to the same logic or source code as defined by the attribute sharing platform. Furthermore, standardizing the messaging that the different types of applications used to request and receive the attributes, for example, utilizing RPCs, provides a standardized manner in which to request and receive the attributes to be used as input for the different types of data processing applications.

The foregoing disclosure provides illustration and description but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, coupled to one or more memory devices, configured to:
     identify, based on a map of attributes mapped to a plurality of computing servers, and based on a particular programming language of a plurality of programming languages associated with an attribute related to a set of data associated with an application, a computing server of the plurality of computing servers for computing a value of the attribute,
       wherein the plurality of computing servers are associated with the plurality of programming languages, and
       wherein the attribute is included in the map of attributes;
     transmit, based on the map of attributes, and to the computing server, a request including data specifying the attribute and the set of data,
       wherein the computing server is configured to compute the value of the attribute based on the request;
     receive, from the computing server, and based on the computing server computing the value of the attribute, a computed value of the attribute; and
     transmit the computed value of the attribute as an input for the application.

2. The device of claim 1, wherein the one or more processors are further configured to:
   receive a first request to compute the value of the attribute based on the set of data associated with the application; and
   validate, based on verifying that the set of data associated with the application includes one or more data variables needed to compute the value of the attribute, the first request.

3. The device of claim 1, wherein the one or more processors are further configured to:
   receive a first request to compute the value of the attribute based on the set of data associated with the application, wherein the first request is generated based on a trigger event; and
   identify, based on the first request, the computing server.

4. The device of claim 1, wherein the one or more processors, to identify the computing server, are configured to:
   identify, based on the map of attributes indicating that the computing server executes code written in a first programming language, the computing server from the plurality of computing servers.

5. The device of claim 1, wherein the attribute is a first attribute,
   wherein the computing server is associated with executing code written in a first programming language, and
   wherein the plurality of computing servers include a second computing server associated with a second programming language related to computing a second attribute.

6. The device of claim 1, wherein the attribute is a first attribute,
   wherein the computing server is a first computing server,
   wherein the application is a first application, and
   wherein the one or more processors are further configured to:
     identify, based on the map of attributes, a second computing server of the plurality of computing servers for computing a value of a second attribute associated with a set of data associated with a second application; and
     transmit the value of the attribute as an input for the second application.

7. The device of claim 6, wherein the first application and the second application are at least one of:
   a batch application,
   a streaming application, or
   an application programming interface based application.

8. A method, comprising:
   identifying, by a device, based on a map of attributes mapped to a plurality of computing servers, and based on a particular programming language of a plurality of programming languages associated with an attribute related to a set of data associated with an application, a computing server of the plurality of computing servers for computing a value of the attribute,
     wherein the plurality of computing servers are associated with the plurality of programming languages, and
     wherein the attribute is included in the map of attributes;
   transmitting, by the device, based on the map of attributes, and to the computing server, a request including data specifying the attribute and the set of data,
     wherein the computing server is configured to compute the value of the attribute based on the request;

receiving, by the device, from the computing server, and based on the computing server computing the value of the attribute, a computed value of the attribute; and transmitting, by the device, the computed value of the attribute as an input for the application.

9. The method of claim 8, further comprising:

receiving a first request to compute the value of the attribute based on the set of data associated with the application; and validating, based on verifying that the set of data associated with the application includes one or more data variables needed to compute the value of the attribute, the first request.

10. The method of claim 8, further comprising:

receiving a first request to compute the value of the attribute based on the set of data associated with the application, wherein the first request is generated based on a trigger event; and identifying, based on the first request, the computing server.

11. The method of claim 8, wherein identifying the computing server further comprises:

identifying, based on the map of attributes indicating that the computing server executes code written in a first programming language, the computing server from the plurality of computing servers.

12. The method of claim 8, wherein the attribute is a first attribute, wherein the computing server is associated with executing code written in a first programming language, and wherein the plurality of computing servers include a second computing server associated with a second programming language related to computing a second attribute.

13. The method of claim 8, wherein the attribute is a first attribute, wherein the computing server is a first computing server, and wherein the application is a first application; and the method further comprising:

identifying, based on the map of attributes, a second computing server of the plurality of computing servers for computing a value of a second attribute associated with a set of data associated with a second application; and transmitting the value of the attribute as an input for the second application.

14. The method of claim 13, wherein the first application and the second application are at least one of:

a batch application, a streaming application, or an application programming interface based application.

15. A non-transitory computer-readable medium storing a set of instructions, the set of instructions comprising:

one or more instructions that, when executed by one or more processors of a device, cause the device to:

identify, based on a map of attributes mapped to a plurality of computing servers, and based on a particular programming language of a plurality of programming languages associated with an attribute related to a set of data associated with an application, a computing server of the plurality of computing servers for computing a value of the attribute, wherein the plurality of computing servers are associated with the plurality of programming languages, and wherein the attribute is included in the map of attributes;

transmit, based on the map of attributes, and to the computing server, a request including data specifying the attribute and the set of data;

receive, from the computing server, and based on the computing server computing the value of the attribute, a computed value of the attribute; and transmit the computed value of the attribute as an input for the application.

16. The non-transitory computer-readable medium of claim 15, wherein the one or more instructions further cause the device to:

receive a first request to compute the value of the attribute based on the set of data associated with the application; and validate, based on verifying that the set of data associated with the application includes one or more data variables needed to compute the value of the attribute, the first request.

17. The non-transitory computer-readable medium of claim 15, wherein the one or more instructions further cause the device to:

receive a first request to compute the value of the attribute based on the set of data associated with the application, wherein the first request is generated based on a trigger event; and identify, based on the first request, the computing server.

18. The non-transitory computer-readable medium of claim 15, wherein the one or more instructions, that cause the device to identify the computing server, cause the device to:

identify, based on the map of attributes indicating that the computing server executes code written in a first programming language, the computing server from the plurality of computing servers.

19. The non-transitory computer-readable medium of claim 15, wherein the attribute is a first attribute, wherein the computing server is associated with executing code written in a first programming language, and wherein the plurality of computing servers include a second computing server associated with a second programming language related to computing a second attribute.

20. The non-transitory computer-readable medium of claim 15, wherein the attribute is a first attribute, wherein the computing server is a first computing server, wherein the application is a first application, and wherein the one or more instructions further cause the device to:

identify, based on the map of attributes, a second computing server of the plurality of computing servers for computing a value of a second attribute associated with a set of data associated with a second application; and transmit the value of the attribute as an input for the second application.

* * * * *